_(12)_ United States Patent  
Hirabayashi et al.

(10) Patent No.: US 7,787,744 B2  
(45) Date of Patent: Aug. 31, 2010

(54) RECORDING APPARATUS, RECORDING METHOD, PROGRAM, RECORDING MEDIUM, AND IMAGE PICKUP APPARATUS

(75) Inventors: Mitsuhiro Hirabayashi, Tokyo (JP); Kenichiro Aridome, Kanagawa (JP); Toshihiro Ishizaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1278 days.

(21) Appl. No.: 10/398,334

(22) PCT Filed: Jul. 24, 2002

(86) PCT No.: PCT/JP02/07483

§ 371 (c)(1),
(2), (4) Date: Apr. 3, 2003

(87) PCT Pub. No.: WO03/030029

PCT Pub. Date: Apr. 10, 2003

(65) Prior Publication Data

US 2004/0047597 A1    Mar. 11, 2004

(30) Foreign Application Priority Data

Aug. 7, 2001    (JP) .............................. 2001-239863

(51) Int. Cl.
*H04N 5/93* (2006.01)
(52) U.S. Cl. ........................................................ 386/52
(58) Field of Classification Search .................... 386/95, 386/52, 46, 125–126, 124, 111
See application file for complete search history.

(56) References Cited

U.S. PATENT DOCUMENTS

| 5,353,132 | A | | 10/1994 | Katsuma | |
|---|---|---|---|---|---|
| 6,018,744 | A | * | 1/2000 | Mamiya et al. | 707/104.1 |
| 6,240,241 | B1 | * | 5/2001 | Yuen | 386/95 |
| 6,507,363 | B1 | * | 1/2003 | Anderson et al. | 348/231.9 |
| 6,871,006 | B1 | * | 3/2005 | Oguz et al. | 386/68 |
| 6,904,227 | B1 | * | 6/2005 | Yamamoto et al. | 386/52 |
| 7,068,913 | B1 | * | 6/2006 | Kurano et al. | 386/46 |

FOREIGN PATENT DOCUMENTS

| EP | 1 085 515 | 3/2001 |
|---|---|---|
| JP | 01 191971 | 8/1989 |
| JP | 11 120044 | 4/1999 |
| JP | 2000 268536 | 9/2000 |
| JP | 2001 34619 | 2/2001 |
| JP | 2001 84705 | 3/2001 |

* cited by examiner

*Primary Examiner*—Thai Tran
*Assistant Examiner*—Tat Chio
(74) *Attorney, Agent, or Firm*—Frommer Lawrence & Haug LLP; William S. Frommer; Thomas F. Presson

(57) ABSTRACT

An entry property 2 contained in an entry property identifies normal or system. The normal represents an entry of entity data. The system represents an entry which describes a definition of flags. The flags represent attribute information of a file. The flags are defined by an apparatus or a user. An entry property 3 identifies valid or invalid of the entry. An entry property 4 represents whether or not a file registered to the entry references another file. A referred counter represents the number of files referred from another file. When a designated file is referenced from another file, a referring file list represents a file which references the designated file. With these information, a reference relation of files can be described.

12 Claims, 18 Drawing Sheets

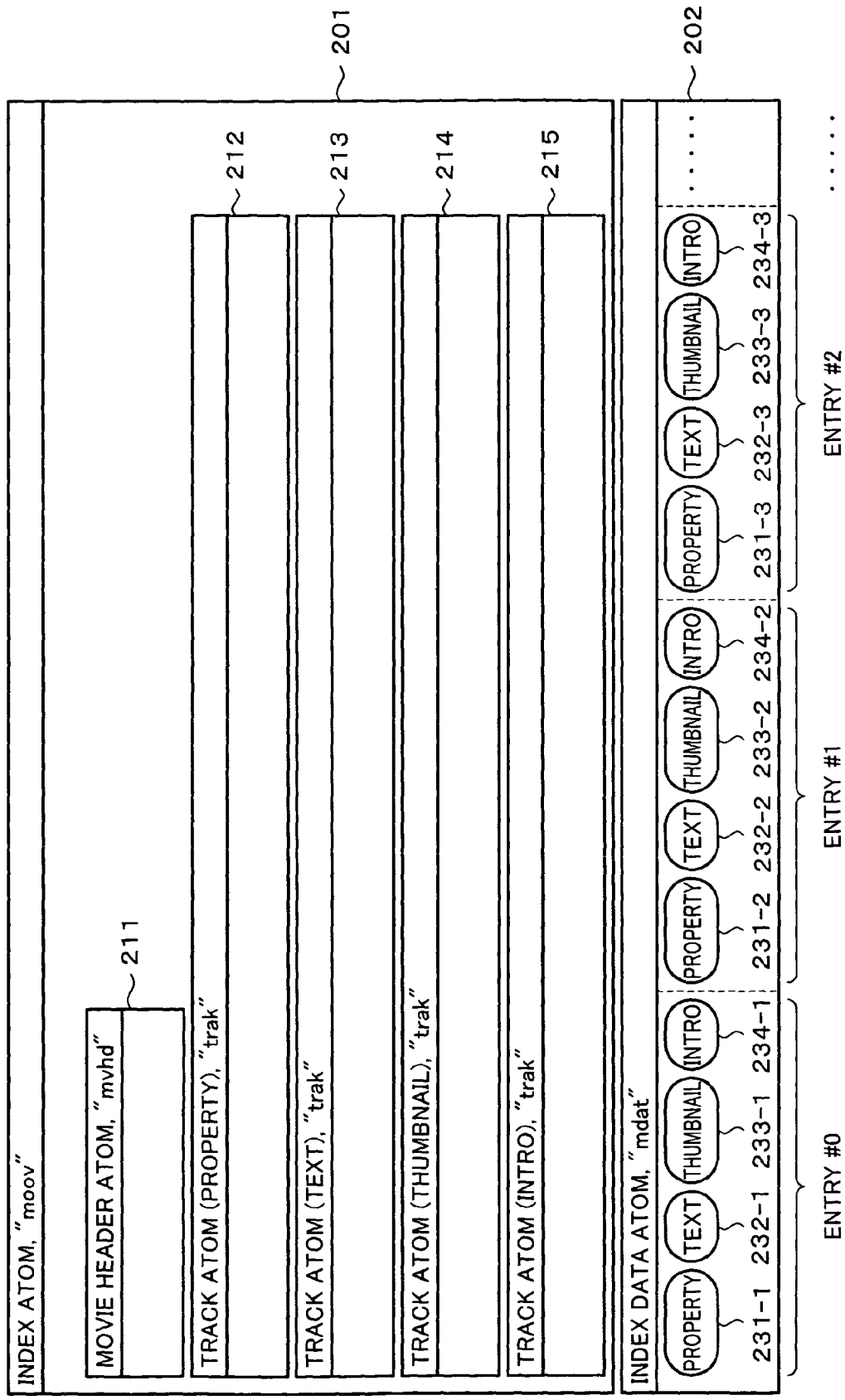

Fig. 6

| START BYTE POSITION | DATA LENGTH | FIELD NAME |
|---|---|---|
| 0 | L_PR1 | AV FILE PROPERTY #1 |
| L_PR1 | L_PR2 | AV FILE PROPERTY #2 |
| L_PR1 + L_PR2 | L_PR3 | AV FILE PROPERTY #3 |
| ⋮ | ⋮ | ⋮ |
| L_PR1 + L_PRn−1 | L_PRn | AV FILE PROPERTY #n |

Fig. 7

| START BYTE POSITION | DATA LENGTH (BYTES) | FIELD NAME | |
|---|---|---|---|
| 0 | 4 | ENTRY NUMBER | ENTRY MANAGEMENT INFORMATION |
| 4 | 1 | ENTRY PROPERTY | |
| 5 | 4 | FOLDER PROPERTY | |
| 9 | 1 | VERSION | ATTRIBUTE INFORMATION OF FILE |
| 10 | 2 | FLAGS | |
| 12 | 1 | DATA TYPE | |
| 13 | 4 | CREATION TIME | |
| 17 | 4 | MODIFICATION TIME | |
| 21 | 4 | DURATION | |
| 25 | 6 | BINARY FILE IDENTIFIER | |
| 31 | 4 | REFERRED COUNTER | |
| 35 | VARIABLE LENGTH (L_RF) | REFERRING FILE LIST | |
| 35 + L_RF | VARIABLE LENGTH (L_FI) | URL FILE IDENTIFIER | |

| ENTRY NUMBER | 0 | 1 | 2 | 3 | 4 | 5 | 6 | 7 | 8 |
|---|---|---|---|---|---|---|---|---|---|
| ENTRY PROPERTY 1<br>0: FOLDER  1: FILE | 0 | 1 | × | 0 | 0 | 1 | 1 | 1 | × |
| ENTRY PROPERTY 2<br>0: NORMAL 1: SYSTEM | 0 | 0 | 1 | 0 | 0 | 0 | 0 | 0 | 1 |
| FOLDER PROPERTY | × | 0 | × | 0 | 3 | 3 | 4 | 4 | × |

Fig. 12
| PROPERTY ENTRY | TEXT ENTRY | THUMBNAIL ENTRY |
|---|---|---|
| ENTRY NUMBER = 2<br>ENTRY PROPERTY 2 = 1 (SYSTEM)<br>FLAGS = 0001 0001 0000 0000 | "BASEBALL"<br>"SKI" | <br> |

| ENTRY NUMBER | 0 | 1 | 2 | 3 | 4 | 5 | 6 | 7 |
|---|---|---|---|---|---|---|---|---|
| ENTRY PROPERTY 1<br>0:FOLDER 1:FILE | 0 | 1 | × | 0 | 0 | 1 | 1 | 1 |
| ENTRY PROPERTY 2<br>0:NORMAL 1:SYSTEM | 0 | 0 | 1 | 0 | 0 | 0 | 0 | 0 |
| FLAGS | × | 0 | 0x1100 | × | × | 0x1000 | 0x0100 | 0x0100 |
| FOLDER PROPERTY | × | 0 | × | 0 | 3 | 3 | 4 | 4 |

| ENTRY NUMBER | 0 | 1 | 2 | 3 | 4 | 5 | 6 | 7 |
|---|---|---|---|---|---|---|---|---|
| ENTRY PROPERTY1<br>0:FOLDER  1:FILE | 0 | 1 | × | 0 | 0 | 1 | 1 | 1 |
| ENTRY PROPERTY2<br>0:NORMAL  1:SYSTEM | 0 | 0 | 1 | 0 | 0 | 0 | 0 | 0 |
| ENTRY PROPERTY3<br>0:VALID  1:INVALID | 0 | 0 | 0 | 0 | 0 | 0 | 0 | 0 |
| ENTRY PROPERTY4<br>0:ABSENCE OF REFERENCE<br>1:PRESENCE OF REFERENCE | × | 0 | × | × | × | 0 | 0 | 0 |
| FOLDER PROPERTY | × | 0 | × | 0 | 0 | 1 | 1 | 4 |
| REFERRED COUNTER | 0 | 2 | 0 | 0 | 3 | 3 | 4 | 0 |
| REFERRING FILE LIST | — | 5,6 | — | — | — | — | — | — |

| ENTRY NUMBER | 0 | 1 | 2 | 3 | 4 | 5 | 7 |
|---|---|---|---|---|---|---|---|
| ENTRY PROPERTY 1<br>0: FOLDER  1: FILE | 0 | 1 | × | 0 | 0 | 1 | 1 |
| ENTRY PROPERTY 2<br>0: NORMAL  1: SYSTEM | 0 | 0 | 1 | 0 | 0 | 0 | 0 |
| ENTRY PROPERTY 3<br>0: VALID  1: INVALID | 0 | 0 | 0 | 0 | 0 | 0 | 0 |
| ENTRY PROPERTY 4<br>0: ABSENCE OF REFERENCE<br>1: PRESENCE OF REFERENCE | × | 0 | × | × | × | 1 | 0 |
| FOLDER PROPERTY | × | 0 | × | 0 | 3 | 3 | 4 |
| REFERRED COUNTER | 0 | 1 | 0 | 0 | 0 | 0 | 0 |
| REFERRING FILE LIST | — | 5 | — | — | — | — | — |

| ENTRY NUMBER | 0 | 1 | 2 | 3 | 4 | 5 | 6 | 7 |
|---|---|---|---|---|---|---|---|---|
| ENTRY PROPERTY 1<br>0: FOLDER  1: FILE | 0 | 1 | × | 0 | 0 | 1 | 1 | 1 |
| ENTRY PROPERTY 2<br>0: NORMAL  1: SYSTEM | 0 | 0 | 1 | 0 | 0 | 1 | 0 | 0 |
| ENTRY PROPERTY 3<br>0: VALID  1: INVALID | 0 | 0 | 0 | 0 | 0 | 0 | 1 | 0 |
| ENTRY PROPERTY 4<br>0: ABSENCE OF REFERENCE<br>1: PRESENCE OF REFERENCE | × | 0 | × | × | × | 1 | 1 | 0 |
| FOLDER PROPERTY | × | 0 | × | 0 | 3 | 3 | 4 | 4 |
| REFERRED COUNTER | 0 | 1 | 0 | 0 | 0 | 0 | 0 | 0 |
| REFERRING FILE LIST | – | 5 | – | – | – | – | – | – |

RECORDING APPARATUS, RECORDING METHOD, PROGRAM, RECORDING MEDIUM, AND IMAGE PICKUP APPARATUS

TECHNICAL FIELD

The present invention relates to a recording apparatus which records video data, audio data, and so forth to a recording medium, in particular, to a recording apparatus which records information which identifies a recording medium in a predetermined format to the recording medium. In addition, the present invention relates to a recording method, a program, and a recording medium used in such a recording apparatus. Moreover, the present invention relates to an electronic camera which has such a recording apparatus.

BACKGROUND ART

For example, a structure of a portable video camera of which an optical disc recording apparatus and a video camera are integrated has been proposed. In such a recording apparatus, data of a plurality of several scenes is recorded as files on an optical disc.

Such a recording apparatus equipped with a display portion, such as a liquid crystal display panel or an organic electroluminescence display panel, and a sound generating portion, such as a speaker, is known as a recording and reproducing apparatus having functions for reproducing and editing recorded data.

According to a proposed related art reference, so that a user can easily search desired data for example picture data from a disc shaped recording medium, parts of a plurality of pictures, sound, and so forth recorded on the recording medium are recorded as management information (referred to as an index file) at a predetermined position for example an innermost periphery area of the disc shaped recording medium.

An index file is a file which contains information with which the content of at least one file recorded on a recording medium is identified. An index file contains attribute information and excerpt information. For example, an index file contains four types of information which are a property, a text, a thumbnail, and an intro. A property is data which represents a title and an attribute of each AV file. A thumbnail and an intro are a representative picture and audio data for around several seconds of a file, respectively.

When an index file has been used, it is necessary to analyze how any files have been arranged. When files are sorted, it is necessary to analyze the entire structure of an index file. When the access speed of the recording medium and the calculation speed of the arithmetic unit are not high, it takes a long time to display a search result or a sort result. Although attribute information of contents such as a moving picture, a still picture, and audio which do not depend on the apparatus and application can be prescribed, when various uses are prescribed, the data amount becomes large. When new attribute information is added, an apparatus which uses the former attribute information cannot distinguish the new attribute information.

In addition, if a file registered in an index file is referenced from another file, the referenced file cannot be deleted. Thus, to delete a file, it is necessary to check the reference relation of files. To analyze the files, it takes a long time. As a result, to delete a file, it takes a long time.

Therefore, an object of the present invention is to provide a recording method and a recording apparatus which allow files to be searched, sorted, and deleted at higher speed than before. Another object of the present invention is to provide a program which causes a computer to execute the recording method and a recording medium from which a computer can read the program. A further object of the present invention is to provide a photographing apparatus which uses the recording method.

DISCLOSURE OF THE INVENTION

One embodiment of the present invention is a recording apparatus for correlating index data of at least one file recoded on a recording medium with entity data of the file, forming the correlated index data in a predetermined format as an index file, and recording the index file to the recoding medium, the attribute information of the file being contained in the index data, the index file further containing system information, the system information prescribing the attribute information. An implementation of the present invention is a recording method, wherein attribute information of at least one file is contained in index data, wherein the index file further contains system information, and wherein the system information prescribes the attribute information.

Another implementation of the present invention is a program for causing a computer to execute a recording method, which comprises the steps of correlating index data of at least one file recoded on a recording medium with entity data of the file; forming the correlated index data in a predetermined format as an index file; and recording the index file to the recoding medium, wherein the attribute information of the file is contained in the index data, wherein the index file further contains system information, and wherein the system information prescribes the attribute information. This implementation of the present invention is a computer readable recording medium on which such a-program has been recorded.

Another embodiment of the present invention is a photographing apparatus for photographing an image of an object and recording a picture signal corresponding to the photographed image to a recording medium, the photographing apparatus comprising: a recording apparatus for correlating index data of at least one file recoded on a recording medium with entity data of the file, forming the correlated index data in a predetermined format as an index file, and recording the index file to the recoding medium, the attribute information of the file being contained in the index data, the index file further containing system information, the system information prescribing the attribute information.

A further embodiment of the present invention is a recording apparatus for correlating index data of a plurality of files recoded on a recording medium with entity data of the files, forming the correlated index data in a predetermined format as an index file, and recording the index file to the recoding medium, the index data further containing reference relation data which represents a reference relation of the files. Another implementation of the present invention is a recording method, wherein an index data further contains reference relation data which represents a reference relation of a plurality of files.

Another implementation of the present invention is a program for causing a computer to execute a recording method, comprising the steps of: correlating index data of a plurality of files recoded on a recording medium with entity data of the files; forming the correlated index data in a predetermined format as an index file; and recording the index file to the recoding medium, wherein the index data further contains reference relation data which represents a reference relation of the files. This implementation of the present invention is a computer readable recording medium on which such a program has been recorded.

A still further embodiment of the present invention is a photographing apparatus, comprising: a recording apparatus for correlating index data of a plurality of files recoded on a recording medium with entity data of the files, forming the correlated index data in a predetermined format as an index file, and recording the index file to the recoding medium, the index data further containing reference relation data which represents a reference relation of the files.

According to the present invention, in the recording apparatus, the recording method, the program, the recording medium on which the program has been recorded, and the photographing apparatus having the recording apparatus, since an index file contains system information which prescribes attribute information of at least one file. Thus, without an increase of data amount of attribute information, desired attribute information can be prescribed. With information which defines for example attribute information, a new apparatus and an old apparatus can handle attribute information. As a result, the generality is improved. According to the present invention, with attribute information of files, they can be searched and sorted at high speed. For example, by extracting only entries of which the same flag bit is 1, files can be searched or sorted.

According to the present invention, in the recording apparatus, the recording method, the program, the recording medium on which the program has been recorded, and the photographing apparatus having the recording apparatus, since entry management information contains information which represents a reference relation of files, without need to access files, the reference relation thereof can be managed. As a result, the determination of whether or not a file can be deleted can be performed at high speed. In addition, an alarm for a user can be displayed at high speed. In addition, since there is information which represents whether each entry is valid/invalid, when a file is deleted, it is not necessary to delete the corresponding entry. As a result, the recording medium can be rewritten in the minimum area. Consequently, the file deleting process can be performed at high speed. In addition, with information which represents whether each entry is valid/invalid, an entry which is treated as an invalid entry (for which an invalidating process has been performed) is detected. An entry to be added to the detected entry is rewritten. As a result, without need to change data of an entry and a management area, the entry can be added at high speed.

BRIEF DESCRIPTION OF DRAWINGS

FIG. 5 is a schematic diagram showing an example of an index file created with a QuickTime movie file;

FIG. 6 is a schematic diagram showing an example of a track atom (property);

FIG. 7 is a schematic diagram showing an example of entity data of a property;

FIG. 12 is a schematic diagram showing an example of which the contents of two flags are registered with entry #2;

BEST MODES FOR CARRYING OUT THE INVENTION

Figure 1:
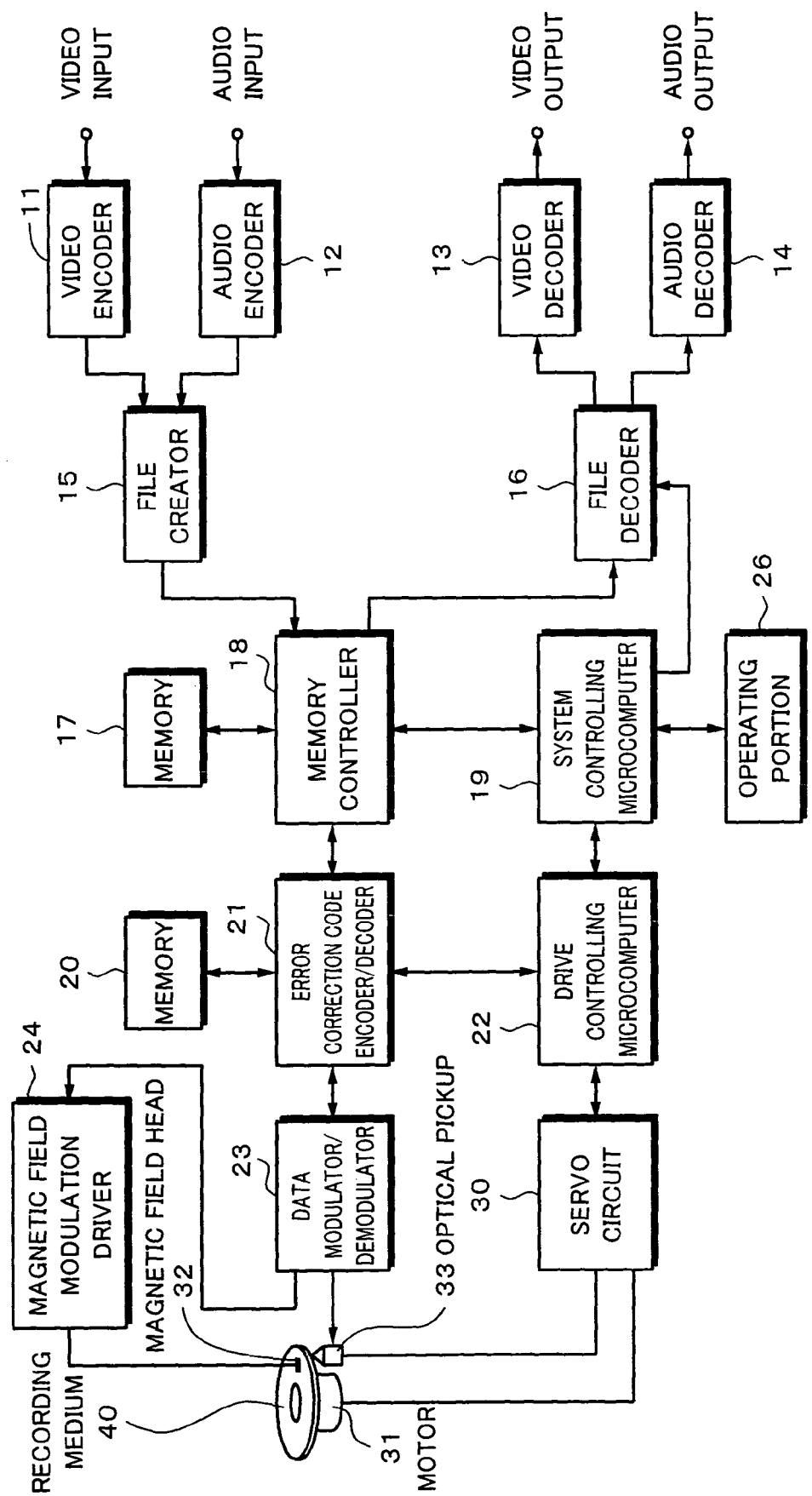
FIG. 1 is a block diagram showing an example of the structure of a digital recording and reproducing apparatus according to the present invention.

Next, with reference to the accompanying drawings, an embodiment of the present invention will be described. In each drawing, redundant description of similar structures may be omitted. FIG. 1 is a block diagram showing an example of the structure of a digital recording and reproducing apparatus. In FIG. 1, the digital recording and reproducing apparatus comprises a video encoder 11, an audio encoder 12, a video decoder 13, an audio decoder 14, a file creator 15, a file decoder 16, memories 17 and 20, a memory controller 18, a system controlling microcomputer 19, an error correction code encoder/decoder 21, a drive controlling microcomputer 22, a data modulator/demodulator 23, a magnetic field modulation driver 24, an operating portion 26, a servo circuit 30, a spindle motor 31, a magnetic field head 32, and an optical pickup 33. Digital data is modulated with a magnetic field by the magnetic field head 32 and the optical pickup 33. The modulated digital data is recorded to a recording medium (in this example, a magneto-optical disc) 40. The recorded data is read from the recording medium 40 by the optical pickup 33.

A video signal is input from a video input terminal. The video signal is supplied to the video encoder 11. The video encoder 11 compresses and encodes the video signal. An audio signal is input from an audio input terminal. The audio signal is supplied to the audio encoder 12. The audio encoder 12 compresses and encodes the audio signal. Output signals of the video encoder 11 and the audio encoder 12 are called elementary streams.

According to the embodiment, the digital recording and reproducing apparatus is disposed in a camera integrated digital recording and reproducing apparatus. The video signal is supplied as a picture photographed by the video camera. An optical system supplies photographed light of an object to an image pickup device such as CCD (Charge Coupled Device) and generates a video signal. As the audio signal, a sound collected by a microphone is supplied.

When the compressing and encoding process corresponds to the MPEG system, the video encoder 11 comprises an A/D converter, a format converting portion, a picture-re-arranging portion, a subtracting device, a DCT portion, a quantizing portion, a variable length code encoding portion, a buffer memory, a rate controlling portion, an inversely quantizing portion, an inverse DCT portion, an adding portion, a video memory, a motion compensating and predicting portion, and a switch as electronic circuits.

A video signal is supplied to the video encoder 11. The A/D converters digitizes the video signal. The format converting portion converts the digitized signal into a spatial resolution used in the encoding process. The spatial resolution is supplied to the picture re-arranging portion. The picture re-arranging portion re-arranges the sequence of pictures so that they can be properly processed in the encoding process. In other words, the picture re-arranging portion re-arranges the sequence of pictures so that after I pictures and P pictures are encoded, B pictures are encoded.

An output signal of the picture re-arranging portion is input to the DCT portion through the subtracting portion. The DCT portion performs a DCT encoding process for the signal supplied from the picture re-arranging portion. An output signal of the DCT portion is input to the quantizing portion. The quantizing portion quantizes the output signal of the DCT portion with a predetermined number of bits. An output signal of the quantizing portion is input to the variable length code encoding portion and the inversely quantizing portion. The variable length code encoding portion encodes the output signal of the quantizing portion with a variable length code such as Huffman code of which a short code is allocated to highly frequent data. The encoded data is output to the buffer memory of the memory. The buffer memory outputs the encoded data as output data of the video encoder at a predetermined rate. Since the code amount generated by the variable length code encoding portion is variable, the rate controlling portion monitors the buffer memory and controls the quantizing operation of the quantizing portion so that a predetermined bit rate is kept.

On the other hand, since I pictures and P pictures are used as reference screens by the motion compensating and predicting portion, a signal which is input from the quantizing portion to the inversely quantizing portion is inversely quantized and then input to the inverse DCT portion. The inverse DCT portion performs the inverse DCT process for the inversely quantized signal. An output signal of the inverse DCT portion and an output signal of the motion compensating and predicting portion are added by the adding portion. The added signal is input to the video memory. An output signal of the video memory is input to the motion compensating and predicting portion. The motion compensating and predicting portion performs a forward prediction, a backward prediction, and a bi-directional prediction for the output signal of the video memory. An output signal of the motion compensating and predicting portion is output to the adding portion and the subtracting portion. The inversely quantizing portion, the inverse DCT portion, the adding portion, the video memory, and the motion compensating and predicting portion compose a local decoding portion which outputs the same decoded video signal as the video decoder.

The subtracting portion subtracts the output signal of the picture re-arranging portion from the output signal of the motion compensating and predicting portion and obtains a predictive error between the video signal and the decoded video signal decoded by the local decoding portion. When the intra-frame encoding process is performed (namely, I pictures are supplied), the switch causes the subtracting portion not to perform a subtracting process for them. In other words, the I pictures are supplied to the DCT portion.

Returning to FIG. 1, when the audio encoder 12 corresponds to MPEG/Audio layer 1/layer 2, the audio encoder 12 further comprises a sub band encoding portion and an adaptive quantizing bit assigning portion as electronic circuits. The audio signal is divided into 32 sub band signals by the sub band encoding portion. The 32 sub band signals are quantized corresponding to psychological hearing sense weighting by the adaptive quantizing bit assigning portion. The quantized signal is output as a bit stream.

To improve the encoding quality, MPEG/Audio layer 3 may be used. When the audio encoder 12 corresponds to the MPEG/Audio layer 3, the audio encoder 12 further comprises an adaptive block length modified discrete cosine transform portion, a folded distortion suppression butterfly portion, a non-linear quantizing portion, and a variable length code encoding portion.

An output signal of the video encoder 11 and an output signal of the audio encoder 12 are supplied to the file creator 15. The file creator 15 converts the video elementary stream and the audio elementary stream into file structures which a computer software program which synchronously reproduces a moving picture, sound, and text can handle without need to use a particular hardware structure. Such a computer software program is for example QuickTime (hereinafter sometimes abbreviated as "QT"). Next, the case that QT is used will be described. The file creator 15 multiplexes the encrypted video data and the encrypted audio data under the control of the system controlling microcomputer 19.

A QuickTime movie file which is output from the file creator 15 is successively written to the memory 17 through the memory controller 18. When the system controlling microcomputer 19 requests the memory controller 18 to write data to a recording medium 40, the memory controller 18 reads a QuickTime movie file from the memory 17.

In this case, the transfer rate of an encoded QuickTime movie is designated so that it is lower than (for example, ½ of) the transfer rate of data written to the recording medium 40. Thus, although a QuickTime movie file is successively written to the memory 17, a QuickTime movie file is intermittently read from the memory 17 under the control of the system controlling microcomputer 19 so that the memory 17 does not overflow or underflow.

The QuickTime movie file which is read from the memory 17 is supplied from the memory controller 18 to the error correction code encoder/decoder 21. The error correction code encoder/decoder 21 temporarily writes the QuickTime movie file to the memory 20 so as to generate redundant data of interleaved data and an error correction code. The error correction code encoder/decoder 21 reads the redundant data from the memory 20 and supplies the redundant data to the data modulator/demodulator 23.

When digital data is recorded to the recording medium 40, the data modulator/demodulator 23 modulates the data so that a clock can be easily extracted from the reproduced signal and no inter-code interference takes place. For example (1, 7) RLL (run length limited) code, Trellis code, or the like can be used.

An output signal of the data modulator/demodulator 23 is supplied to the magnetic field modulation driver 24 and the optical pickup 33. The magnetic field modulation driver 24 drives the magnetic field head 32 corresponding to the input signal so as to apply a magnetic field to the recording medium 40. The optical pickup 33 radiates a recording laser beam corresponding to the input signal to the recording medium 40. Corresponding to the magnetic field modulating system, data is recorded to the recording medium 40.

The recording medium 40 is a disc shaped recording medium, for example a magneto optical disc (MO: magneto-optical disc). Besides a magneto optical disc, the recording medium 40 may be a rewritable disc shaped recording medium such as a phase change type disc or a magnetic disc.

To allow an index file which will be described later to be easily read, it is preferred to record it on the substantially innermost periphery of a disc shaped recording medium (for example, a record portion immediately preceded by a lead-in portion).

According to the embodiment, an MO, for example, a relatively small disc whose diameter is around 4 cm, 5 cm, 6.5 cm, or 8 cm, is used. The recording medium 40 is rotated at constant linear velocity (CLV), constant angular velocity (CAV), or zone CLV (ZCLV) by the motor 31.

The drive controlling microcomputer 22 outputs a signal to the servo circuit 30 corresponding to a request from the system controlling microcomputer 19. The servo circuit 30 controls the spindle motor 31 and the optical pickup 33 corresponding to the output signal of the drive controlling microcomputer 22. As a result, the drive controlling microcomputer 22 controls the entire drive. For example, the servo circuit 30 performs a radius traveling servo operation, a tracking servo operation, and a focus servo operation for the recording medium 40 and controls the rotations of the spindle motor 31. The operating portion 26 is connected to the system controlling microcomputer 19. The user can input a predetermined command to the operating portion 26.

In the reproduction mode, the optical pickup 33 radiates a laser beam having a reproduction output level to the recording medium 40. The optical detector of the optical pickup 33 receives the reflected light as a reproduction signal. In this case, the drive controlling microcomputer 22 detects a tracking error and a focus error from an output signal of the optical detector of the optical pickup 33. The servo circuit 30 controls the optical pickup 33 so that the reading laser beam focuses on a predetermined track. In addition, the drive controlling microcomputer 22 controls the traveling in the radius direction of the optical pickup so as to reproduce data at a desired position on the recording medium 40. Like the record mode, the desired position is determined by the system controlling microcomputer 19 in such a manner that it supplies a predetermined signal to the drive controlling microcomputer 22.

A signal reproduced by the optical pickup 33 is supplied to the data modulator/demodulator 23. The data modulator/demodulator 23 demodulates the reproduced signal. The demodulated data is supplied to the error correction code encoder/decoder 21. The reproduced data is temporarily stored in the memory 20. The error correction code encoder/decoder 21 performs a de-interleaving process and an error correcting process for the demodulated data. The QuickTime movie file which has been error corrected is stored to the memory 17 through the memory controller 18.

The QuickTime movie file stored in the memory 17 is output to the file decoder 16 corresponding to a request from the system controlling microcomputer 19. The system controlling microcomputer 19 monitors the data amount of the reproduction signal reproduced from the recording medium 40 and stored in the memory 17 and the data amount of the data which is read from the memory 17 and supplied to the file decoder 16 and controls the memory controller 18 and the drive controlling microcomputer 22 so that the memory 17 does not overflow or underflow. In such a manner, the system controlling microcomputer 19 intermittently reads data from the recording medium 40.

The file decoder 16 separates the QuickTime movie file into a video elementary stream and an audio elementary file under the control of the system controlling microcomputer 19. The video elementary stream is supplied to the video decoder 13. The video decoder 13 decodes the video elementary stream which has been compressed and encoded. The decoded video data is output from a video output terminal. The audio elementary stream is supplied to the audio decoder 14. The audio decoder 14 decodes the audio elementary stream which has been compressed and encoded. The decoded audio data is output from an audio output terminal. The file decoder 16 synchronously outputs the video elementary stream and the audio elementary stream.

When the video decoder 13 corresponds to the MPEG system, the video decoder 13 comprises a buffer memory, a variable length code decoding portion, an inversely quantizing portion, an inverse DCT portion, an adding portion, a video memory, a motion compensating and predicting portion, a picture re-arranging portion, and a digital/analog converter (hereinafter abbreviated as "D/A") as electronic circuits. A video elementary stream is temporarily stored in the buffer memory. Thereafter, the video elementary stream is input to the variable length code decoding portion. The variable length code decoding portion decodes macro block encoded information and separates it into a predicting mode, a moving vector, quantizer information, and quantized DCT coefficients. The inversely quantizing portion de-quantizes the quantized DCT coefficients into. DCT coefficients. The inverse DCT portion coverts the DCT coefficients into pixel spatial data. The adding portion adds an output signal of the inverse DCT portion and an output signal of the motion compensating and predicting portion. However, when an I picture is decoded, the adding portion does not add these output signals. All macro blocks of the screen are decoded. The picture re-arranging portion re-arranges the decoded macro blocks in the original input sequence. The D/A converts the re-arranged data into an analog signal. Since an I picture and a P picture are used as reference screens in the decoding process which follows, they are stored in the video memory. The I picture and the P picture are output to the motion compensating and predicting portion.

When the audio decoder 14 corresponds to MPEG/Audio layer 1/layer 2, the audio decoder 14 comprises a bit stream disassembling portion, an inversely quantizing portion, and a sub band combining filter bank portion as electronic circuits. An input audio elementary stream is supplied to the bit stream disassembling portion. The bit stream disassembling portion separates the input audio elementary stream into a header, auxiliary information, and a quantized sub band signal. The inversely quantizing portion inversely quantizes the quantized sub band signal with a predetermined number of bits which has been assigned. The sub band combining filter bank combines the inversely quantized data and outputs the combined data.

Figure 2:
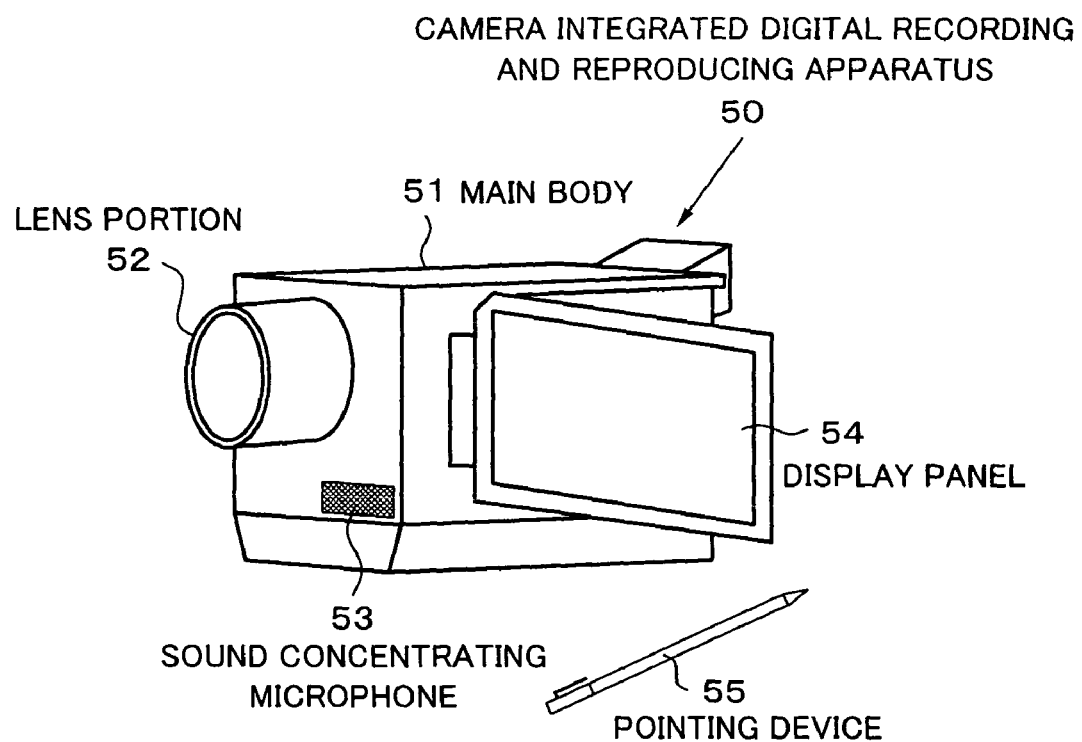
FIG. 2 is a schematic diagram showing an appearance of a camera integrated digital recording and reproducing apparatus.

FIG. 2 is a schematic diagram showing an appearance of a camera integrated digital recording and reproducing apparatus. In FIG. 2, the camera integrated digital recording and reproducing apparatus 50 comprises a main body 51, a lens portion 52, a sound concentrating microphone 53, and a display panel 54. The digital recording and reproducing apparatus shown in FIG. 1 is disposed in the main body 51. Photographed light of an object is supplied from an optical system of the lens portion 52 to an image pickup device. The image pickup device generates a video signal corresponding to the photographed light. An audio signal is generated by the sound concentrating microphone 53. The display panel 54 displays a reproduced picture and data corresponding to an operation of the apparatus. The display panel 54 is composed of a liquid crystal display and a piezoelectric device. When the user inputs a desired operation command, he or she presses the display portion with a pointing device 55.

The display panel 54 is used to display a picture which is photographed and monitored and a picture reproduced from the recording medium. In addition, picture information for example a thumbnail picture recorded as an index file is displayed on the display panel 54. In reality, a plurality of thumbnail pictures are arranged and displayed on the display panel 54. Since the number of thumbnail pictures displayed on the display panel 54 at a time is limited, they can be scrolled with scroll keys displayed on the display panel 54 or keys disposed on the main body 51. When a desired thumbnail picture is designated with the pointing device 55 or the cursor, files which deal with picture data and audio data corresponding to the designated thumbnail picture are reproduced.

When a recording medium is formatted or after a picture is photographed, the camera integrated digital recording and reproducing apparatus 50 creates excerpt information of a file. According to the embodiment, an index file is created in the format of a QuickTime movie file. Since an index file is created in the format of a QuickTime movie file, a plurality of types of entity data such as video data and audio data, and excerpt information of a file can be recorded in the same format. Thus, the recoding and reproducing apparatus can reproduce all types of data on QT.

Next, a QuickTime movie file will be described in brief. QT is a software program which manages various types of data along the time base and which has an OS extension function for synchronously reproducing a moving picture, a sound, a text, and so forth without need to use a special hardware device. QT has been disclosed in for example "Inside Macintosh: QuickTime (Japanese Edition)," Addison Wesley.

A basic data unit of a QT movie resource is called an atom. Each atom contains a size and type information along with data. On QT, the minimum unit of data is treated as a sample. As a set of samples, a chunk is defined.

Figure 3:
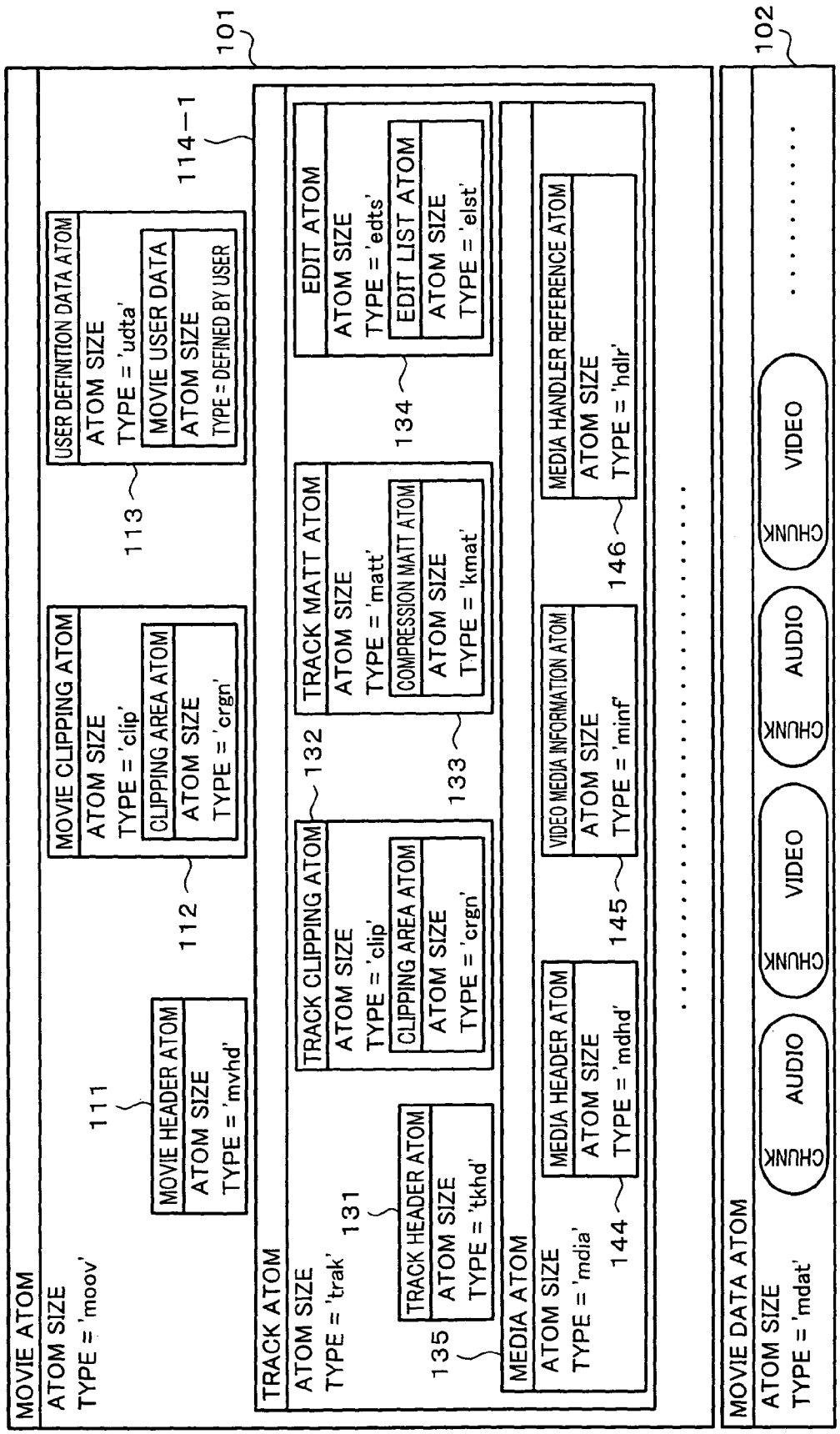
FIG. 3 is a schematic diagram showing an example of the structure of a QuickTime movie file.
Figure 4:
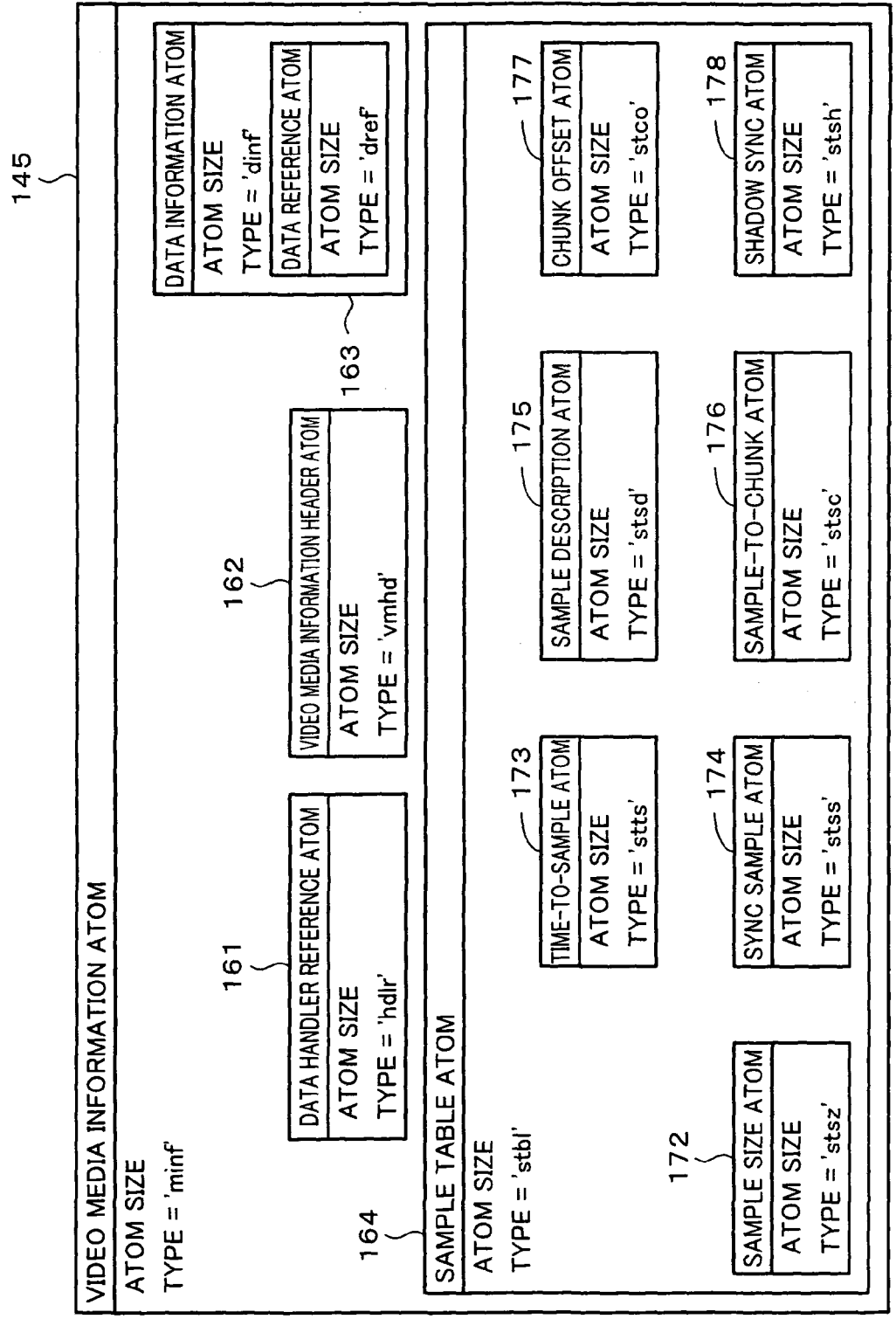
FIG. 4 is a schematic diagram showing an example of the structure of a video media information atom.

FIG. 3 is a schematic diagram showing an example of the structure of a QuickTime movie file. FIG. 4 is a schematic diagram showing an example of the structure of a video media information atom. FIG. 4 is a schematic diagram showing details of the video media information atom shown in FIG. 3 in the case that tracks are video information.

In FIGS. 3 and 4, a QuickTime movie file is mainly composed of two portions which are a movie atom 101 and a movie data atom 102. The movie atom 101 is a portion which contains information necessary for reproducing the file and information necessary for referencing entity data. The movie data atom 102 is a portion which contains entity data of such as video data, audio data, and so forth.

The movie atom 101 contains a movie header atom 111, a movie clipping atom 112, a user definition data atom 113, at least one track atom 114, and so forth. The movie header atom 111 contains information with respect to the entire movie. The movie clipping atom 112 designates a clipping area.

The track atom 114 is provided for each track of a movie. The track atom 114 contains a track header atom 131, a track clipping atom 132, a track matte atom 133, an edit atom 134, and a media atom 135. The track atom 114 describes information with respect to individual pieces of data of the movie data atom 102 in the atoms 131 to 135. FIG. 3 shows only a track atom 114-1 of a video movie (omitting other track atoms).

The media atom 135 contains a media header atom 144, a media information atom (video media information atom 145 in FIGS. 3 and 4), and a media handler reference atom 146. The media atom 135 describes information which defines components for interpreting data of a movie track and media data in the media header atom 144, the media information atom, and the media handler reference atom 146.

The media handler maps a media time to media data using the information of the media information atom.

The media information atom 145 contains a data handler reference atom 161, a media information header atom 162, a data information atom 163, and a sample table atom 164.

The media information header atom (a video media information header atom 162 in FIG. 4) describes information with respect to media. The data handler reference atom 161 describes information with respect to handling of media data. The data handler reference atom 161 contains information which designates a data handler component which provides an access means for media data. The data information atom 163 contains a data reference atom. The data reference atom describes information with respect to data.

The sample table atom 164 contains information necessary for converting a media time into a sample number which represents a sample position. The sample table atom 164 is composed of a sample size atom 172, a time-to-sample atom 173, a sync sample atom 174, a sample description atom 175, a sample-to-chunk atom 176, a chunk offset atom 177, and a shadow sync atom 178.

The sample size atom 172 describes the size of a sample. The time-to-sample atom 173 describes the relation between samples and time base (how many seconds and minutes of data have been recorded ?). The sync sample atom 174 describes information with respect to synchronization and designates a key frame of media. A key frame is a self included frame which does not depend on the preceding frame. The sample description atom 175 contains information necessary for decoding a sample of media. Media can have at least one sample description atom corresponding to a compression type used in media.

The sample-to-chunk atom 176 references a table contained in the sample description atom 175 and identifies a sample description corresponding to each sample of media. The sample-to-chunk atom 176 describes the relation between samples and chunks. The sample-to-chunk atom 176 identifies the position of a sample of media corresponding to information of the beginning chunk, the number of samples per chunk, and a sample description ID. The chunk offset atom 177 describes the start bit position of a chunk of movie data and defines the position of each chunk of a data stream.

In FIG. 3, the movie data atom 102 contains audio data which has been encoded corresponding to a predetermined compressing and encoding system and video data which has been encoded corresponding to a predetermined compressing and encoding system in the unit of a chunk composed of a predetermined number of samples. It is not always necessary to compress and encode data. Instead, linear data can be contained. For example, when text, MIDI (Musical Instrument Digital Interface), or the like is handled, the movie data atom 102 contains entity data of text, MIDI, or the like. Correspondingly, the movie atom 101 contains a text track, a MIDI track, or the like. Each track of the movie atom 101 is correlated with data contained in the movie data atom 102.

With such a hierarchical structure, when QT reproduces data contained in the movie data atom 102, QT successively traces the hierarchical structure from the movie atom 101, maps a sample table to memory corresponding to the atoms 172 to 178 contained in the sample table atom 164, and identifies the relation of each piece of data. QT reproduces data corresponding to the relation of each piece of data.

QT has such a data structure. Thus, in the index file according to the embodiment, entity data of excerpt information of the file is contained in the movie data atom. Management information of the entity data is contained in the movie atom. Hereinafter, the movie data atom of the index file is called index data atom. The movie atom is called index atom.

The index file depends on data handled by a file recorded on a recording medium. According to the embodiment, however, it is assumed that types of data of a file are video data and audio data. Hereinafter, such a file is abbreviated as "AV file".

When an AV file has been recorded on a recording medium, the index file contains for example four types of data which are a property, a text, a thumbnail, and an intro. A property is data which represents an attribute of each AV file. A property also contains information for referencing entity data of an AV file. Thus, in the index file, only a property which contains attribute information is essential. A text is data which represents a character string of a title of each AV file. A thumbnail is data of one representative picture of each AV file. The user can freely assign a thumbnail of each AV file. Alternatively, for example, the first picture data of each AV file can be automatically assigned as a thumbnail.

An intro is representative audio data of a short period of each AV file. The user can freely assign an intro of each AV file. Alternatively, audio data of the first several seconds, for example five seconds, of each AV file may be assigned as an intro thereof. When necessary, in consideration of the searching efficiency, areas for a title, a thumbnail, and an intro may be provided in the index file. Although data of a property should be registered, even if the areas for a title, a thumbnail, and an intro have been allocated, it is not necessary to register all data of the title, thumbnail, and intro.

FIG. 5 is a schematic diagram showing an example of an index file created with a QuickTime movie file. In FIG. 5, an index file is composed of an index atom 201 and an index data atom 202.

The index data atom 202 contains entity data of a property, a text, a thumbnail, and an intro. Entity data 231, 232, 233, and 234 of the property, text, thumbnail, and intro of each AV file are contained in entry #1 to entry #n (where n is any integer which is two or greater) which are areas starting from a first area of the index data atom 202.

The index atom 201 is composed of a movie header atom 211, a track atom (property) 212, a track atom (text) 213, a track atom (thumbnail) 214, and a track atom (intro) 115 corresponding to entity data of the property, text, thumbnail, and intro, respectively. As was described above, the track atom (property) 212 and the entity data 231 of the property are essential.

FIG. 6 is a schematic diagram showing an example of the track atom (property). In FIG. 6, the track atom (property) 212 has a format of a table which correlates AV file property #1, AV file property #2, ..., AV file property #n defined as chunks of property data of each AV file, data lengths L_PR1, L_PR2, ..., L_PRn, and start byte positions 0, L_PR1, L_PR1+L_PR2, ..., L_PR+1+ ... +L_PRn−1. The data length is for example a variable length in the unit of a byte.

The relation of a track atom (text), a track atom (thumbnail), a track atom (intro), entity data of a text, entity data of a thumbnail, and entity data of an intro is the same as the relation of the forgoing track atom (property) and entity data of a property.

FIG. 7 is a schematic diagram showing an example of entity data of a property. Entity data of a property is composed of entry management information and file attribute information. The entry management information is information for managing the entry itself. The entry management information is composed of an entry number, an entry property, and a folder property.

The entry number is a number which starts from 0. The entry number is a unique number in the index file. The entry number represents an entry which contains the entity data of the property. The entry number is four-byte data which starts from byte 0. The camera integrated digital recording and reproducing apparatus 50 searches the entry numbers and obtains an area which contains the disc title.

The entry property is one-byte data which starts from byte 4. The entry property represents an attribute and a state of the entry. The entry property contains entry property 1, entry property 2, entry property 3, and entry property 4 each of which is composed of one byte.

The entry property 1 identifies (0: folder; 1: file). The entry property 2 identifies (0: normal; 1: system). The normal represents an entry of entity data of the property. The system represents an entry which describes a definition of a flag which will be described later. The folder property is four-byte data which starts from byte 5. The folder property represents a folder to which the entry belongs.

The entry property 3 identifies (0: valid; 1: invalid) for the entry. The entry property 4 represents whether or not the file registered to the entry references another file and identifies (0: absence of reference; 1: presence of reference).

The file attribute information is composed of a version, flags, a data type, a creation time, a modification time, a duration, a binary file identifier, a referred counter, a referring file list, and a URL file identifier.

The version is one-byte data which starts from byte 9. The version is a version number of the file registered to the entry. The flags are two-byte data which starts from byte 10. The flags identify an attribute of the file. The data type is one-byte data which starts from byte 12. The data type represents the type of data (a moving picture, a still picture, audio, or the like) of a title file or an AV file corresponding to the property.

The creation time represents the date and time on and at which a title file or an AV file corresponding to the property was created. The creation time is four-byte data which starts from byte 17. The modification time represents the date and time on and at which a title file or an AV file corresponding to the property was modified. The modification time is four-byte data which starts from byte 17. The duration represents a time period necessary for reproducing a title file or an AV file corresponding to the property. The duration is four-byte data which starts from byte 21. The binary file identifier is binary data which represents the location of a file corresponding to the property. The file identifier is six-byte data which starts from byte 25.

The referred counter represents the number of files from which a particular file is referenced. The referred counter is four-byte data which starts from byte 31. The referring file list represents a file which references anther file. The referring file list is data having a variable length L_RF which starts from byte 35. The referring file list describes an entry number or an ID which represents the location of a real file. The URL file identifier is URL type data which represents the location of a file. The URL file identifier is data having a variable length L_FI which starts from byte (35+L_RL).

Figures 8A, 8B:
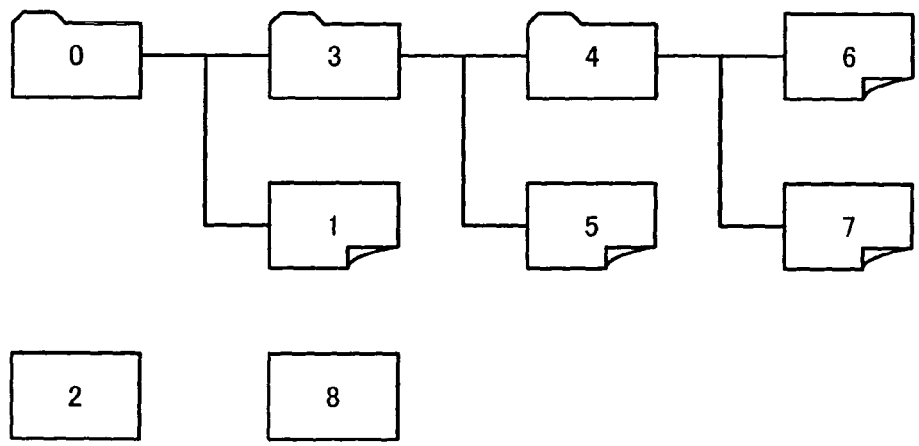
FIG. 8A is a schematic diagram showing an example of entry management information extracted from property information of a plurality of entries #0 to #8.
FIG. 8B is a schematic diagram showing a hierarchical structure represented with entry management information.

The forgoing entry management information can have a virtual hierarchical structure as shown in FIG. 8. FIG. 8A shows an example of entry management information extracted from property information of a plurality of entries #0 to #8. FIG. 8B shows a hierarchical structure represented with the entry management information shown in FIG. 8A. Next, a management of AV files with the entry management information will be described.

In the example shown in FIG. 8, the entry property 1 and the entry property 2 represent that entries #0, #3, and #4 are folders, entries #1, #5, #6, and #7 are files, and entries #2 and #8 are system information. Entries #2 and #8 are not contained in the hierarchy. In addition, the folder property represents that entries #1 and #3 belong to entry #0 which is a folder, entries #4 and #5 belong to entry #3 which is a folder, and entries #6 and #7 belong to entry #4 which is a folder. Thus, these entry management information prescribes a hierarchical structure shown in FIG. 8B.

Figures 9A, 9B:
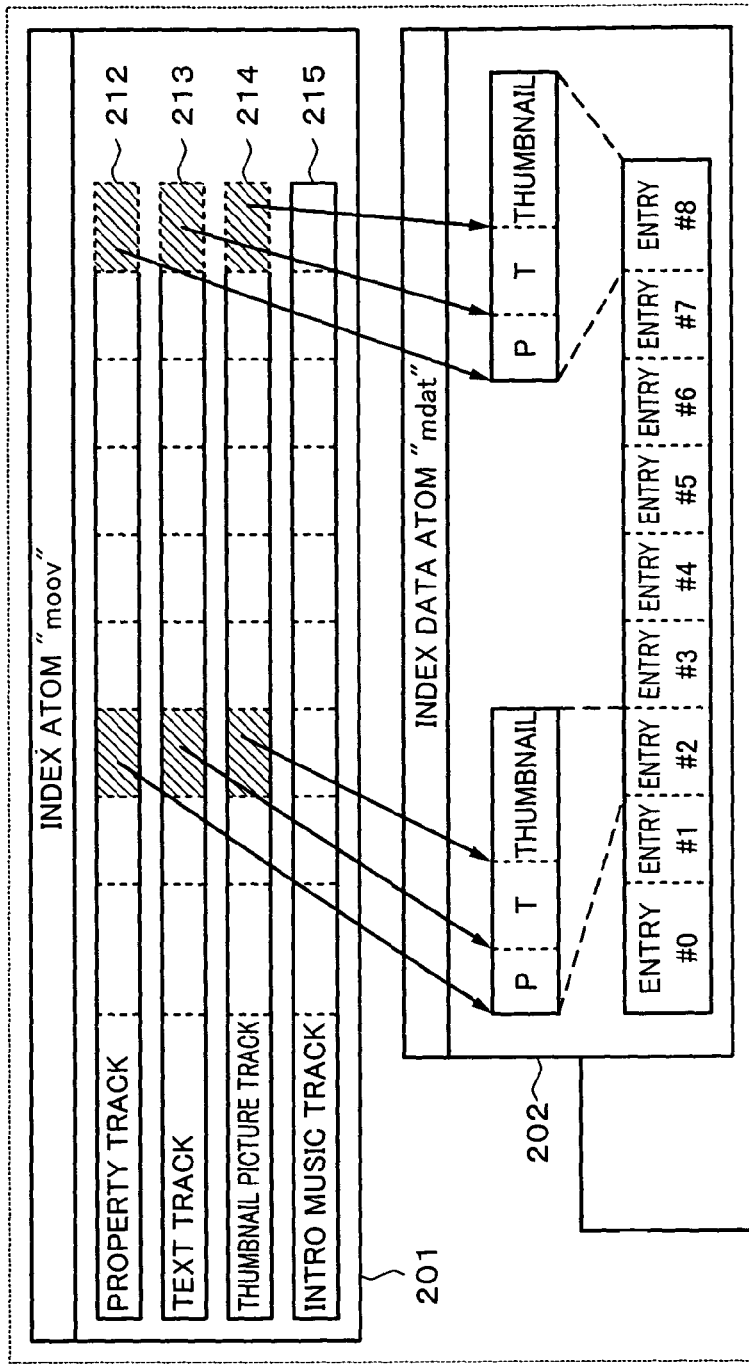
FIG. 9A is a schematic diagram showing an example of the structure of an index file.
FIG. 9B is a schematic diagram showing a real example of a part of property information of entries #0 to #8.

FIG. 9A shows an index file. As shown in FIG. 9A, as with other normal entries., each of entries #2 and #8, which are system information, is composed of data of a property, a text, and a thumbnail. Since an intro is not essential, as shown in FIG. 9B, entries #2 and #8, which are system information, do not contain data of an intro. As with other normal entries, an entry which is system information is managed with the track atom (property) 212, the track atom (text) 213, and the track atom (thumbnail) 214 of the index atom 201. FIG. 9B shows a part of property information of entries #0 to #8. The part of the property information shown in FIG. 9B is the same as that shown in FIG. 8A.

Figure 10:
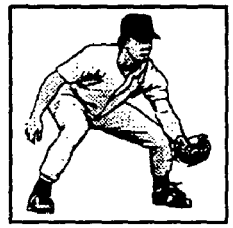
FIG. 10 is a schematic diagram showing an example of which the content of one flag is registered with entry #2.

FIG. 10 shows an example of which entry #2, which is system information, contains flag information. The flags are composed of two bytes (16 bits). The flags represent attributes which depend on bits at which "1" is set. Thus, the flags can define up to 16 kinds of attributes. The maximum number of attributes which the flag can define can be limited. In the example shown in FIG. 10, bit 4 (fourth bits from the MSB) of byte 1 is set to 1. The flag value is 0x1000 (where 0x represents hexadecimal notation). In this example, text data is "BASEBALL." Thumbnail data is a thumbnail picture (icon) of a baseball.

Figure 11:
FIG. 11 is a schematic diagram showing another example of which the content of one flag is registered with entry #8.

FIG. 11 shows an example of which entry #8, which is system information, contains flag information. In the example shown in FIG. 11, bit 8 (eighth bit from the MSB) of byte 1 is 1. Thus, the flag value is 0x0100. In this case, text data is "SKI." The thumbnail data is a thumbnail picture (icon) of a ski.

In the examples shown in FIGS. 10 and 11, with one entry, an attribute of one bit of the flags is defined. Alternatively, as shown in FIG. 12, with one entry, for example entry #2, an attribute of a plurality of bits for example two bits can be defined. For example, bits 4 and 8 (fourth and eighth bits from the MSB) of byte 1 are set to 1. The flag value is 0x1100. In this case, the text data is "BASEBALL" and "SKI." Two thumbnail pictures of a baseball and a ski are recorded.

When a plurality of bits of the flags are defined with one entry, the relation of the flags, texts, and thumbnail pictures are pre-designated. For example, texts and thumbnail pictures are successively arranged in the order of bits on the MSB side of the flags. In the case of a text, it is delimited at intervals of a predetermined number of characters. The text information is recorded in the order of delimited characters. Alternatively, using a markup language such as HTML (Hyper Text Markup Language), tags can be embedded so as to distinguish a plurality of texts. Pixels of a picture may be defined as a thumbnail picture. The location of a picture in a file as a thumbnail picture may be defined. Pixel position information may be stored with tags of a text or may be stored in comment information of a thumbnail picture.

Figures 13A, 13B:
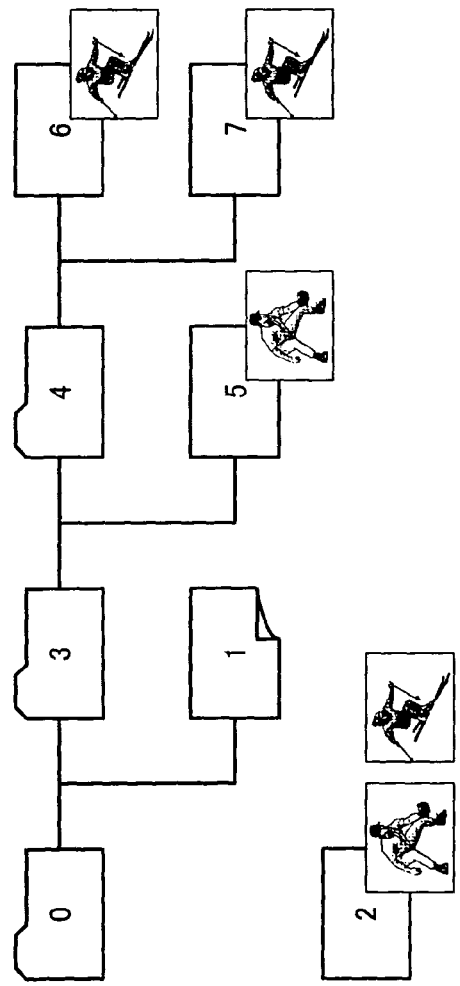
FIG. 13A is a schematic diagram showing entry management information and flags of entries #0 to #7.
FIG. 13B is a schematic diagram showing a hierarchical structure represented with an entry flag.

FIG. 13 shows a method for arranging files in the case that attributes of two bits of the flags are defined with entry #2. FIG. 13A shows entry management information and flags of entries #0 to #7. The entry management information (an entry number, an entry property 1, an entry property 2, and a folder property) shown in FIG. 13A is the same as the information of entries #0 to #7 shown in FIGS. 8 and 9. In FIG. 13A, entry #2 is system information. The flags are 0x1100. As was described with reference to FIG. 12, the flags contain information of two attributes.

The flags of entry #1 which is a file are 0. Thus, the flags do not define an attribute of entry #1. The flags of entry #5 which is a file are 0x1000 which represents "BASEBALL" as an attribute. The flags of each of entries #6 and #7 are 0x0100 which represents "SKI" as an attribute.

The entry management information and the flags shown in FIG. 13A define a hierarchical structure shown in FIG. 13B. The flags define attribute information of files. Thus, when a recording medium for example an optical disc on which an index file has been recorded is reproduced with a file attribute defined with the flags, only a file corresponding to the attribute in the index file can be displayed. In addition, a desired AV file can be designated in the displayed index file. Thus, the user can search his or her desired AV file at high speed. In addition, the flags are defined with system information. Thus, only a desired range can be defined. As a result, the data amount does not become large. In addition, definitions of flags can be changed for each recording medium. As a result, the generality is improved.

In addition, the method of which the apparatus has system information which defines the flags or the method of which the user defines the flags can be selected. For example, according to the embodiment, since the flags are composed of two bytes, a first byte and a second byte thereof can be assigned to a flag defined by the apparatus for example a photographing apparatus having an optical disc recording and reproducing apparatus and a flag defined by the user.

Figures 14A, 14B:
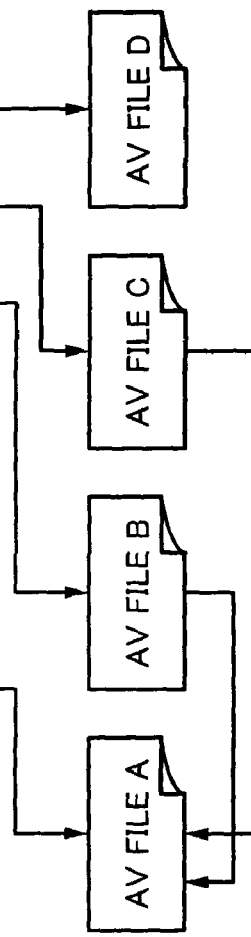
FIG. 14A is a schematic diagram showing an example of property information necessary for representing a reference relation of entries #0 to #7.
FIG. 14B is a schematic diagram showing a reference relation of files.

Next, a method for representing a reference relation of entries using a part of entry management information and file attribute information will be described. FIG. 14A shows an example of property information necessary for representing a reference relation of entries #0 to #7. In an entry property (one byte), entry property 1 to entry property 4 are defined. The entry property 1 is used to identify a file or a folder. The entry property 2 is used to identify normal information or system information. A folder property represents a folder to which the current entry belongs. The entry properties 1 and 2 and the folder property are the same as those of the forgoing example.

The entry property 3 identifies the current entry (0: valid; 1: invalid). The entry property 4 represents whether or not a file registered to the current entry references another file (0: absence of reference; 1: presence of reference). A referred counter represents the number of files from which the current file is referenced. A referring file list represents a file which references the current file.

In the example shown in FIG. 14A, the entries are valid. The entry property 3 of the entries is 0. Since files registered to entries #5 and #6 reference other files, the entry property 4 of entries #5 and #6 is 1. The referred counter of entry #1 is 2. Thus, the file of entry #1 is referenced from two files. The files which reference the file of entry #1 are registered to entries #5 and #6 which are represented in the reference file list.

Now, it is assumed that an AV file registered to entry #1 is an AV file A and that AV files registered to entries #5, #6, and #7 are AV files B, C, and D, respectively. In addition, it is assumed that the property information shown in FIG. 14A corresponds to the reference relation of the files shown in FIG. 14B. In other words, the files C and D registered to entries #5 and #6 reference the file A registered to entry #1, the entry property 4 of entries #5 and #6 is 1. The reference counter of entry #1 is 2. The referring file list of entry #1 is 5, 6.

When a desired AV file is deleted from AV files recorded on a recording medium, if the desired AV file is referenced from another AV file, the desired AV file cannot be deleted. Depending on whether or not the value of the referred counter is 0, it can be determined whether or not a desired AV file can be deleted. In the example shown in FIG. 14, since the value of the referred counter of the AV file A is 2, it is clear that the file A cannot be deleted.

Figures 15A, 15B:
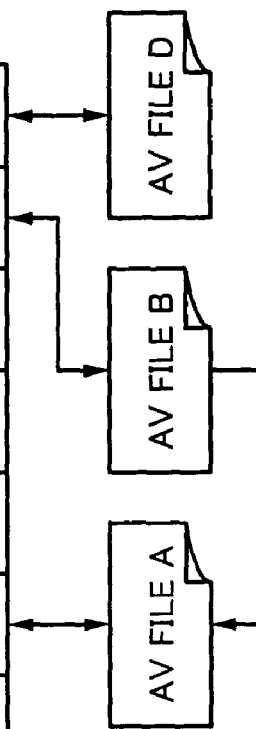
FIG. 15A is a schematic diagram showing another example of property information necessary for representing a reference relation of entries #0 to #7.
FIG. 15B is a schematic diagram showing a reference relation of files.
Figures 16A, 16B:
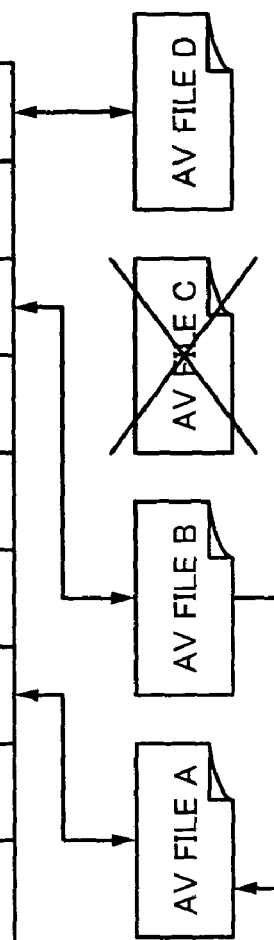
FIG. 16A is a schematic diagram showing another example of property information necessary for representing a reference relation of entries #0 to #7.
FIG. 16B is a schematic diagram showing a reference relation of files.

When an AV file is deleted, the corresponding entry can be processed in one of the following two methods. In the first method, as shown in FIG. 15, when the AV file C is deleted, the corresponding entry #6 is actually deleted. In the second method, as shown in FIG. 16, without need to delete entry #6, the value of the entry property 3 of entry #6 is changed to (1) which represents invalidity. Any one of these methods can be used.

The method of which as an AV file is deleted, the corresponding entry is actually deleted is more advantageous than the method of which the entry is not actually deleted from a view point of the storage capacity of the recording medium. However, the method of which the entry is actually deleted is lesser advantageous than the method of which the entry is not deleted from a view point of the process time because not only the entity data of the entry but the track atom should be rewritten.

Figure 17:
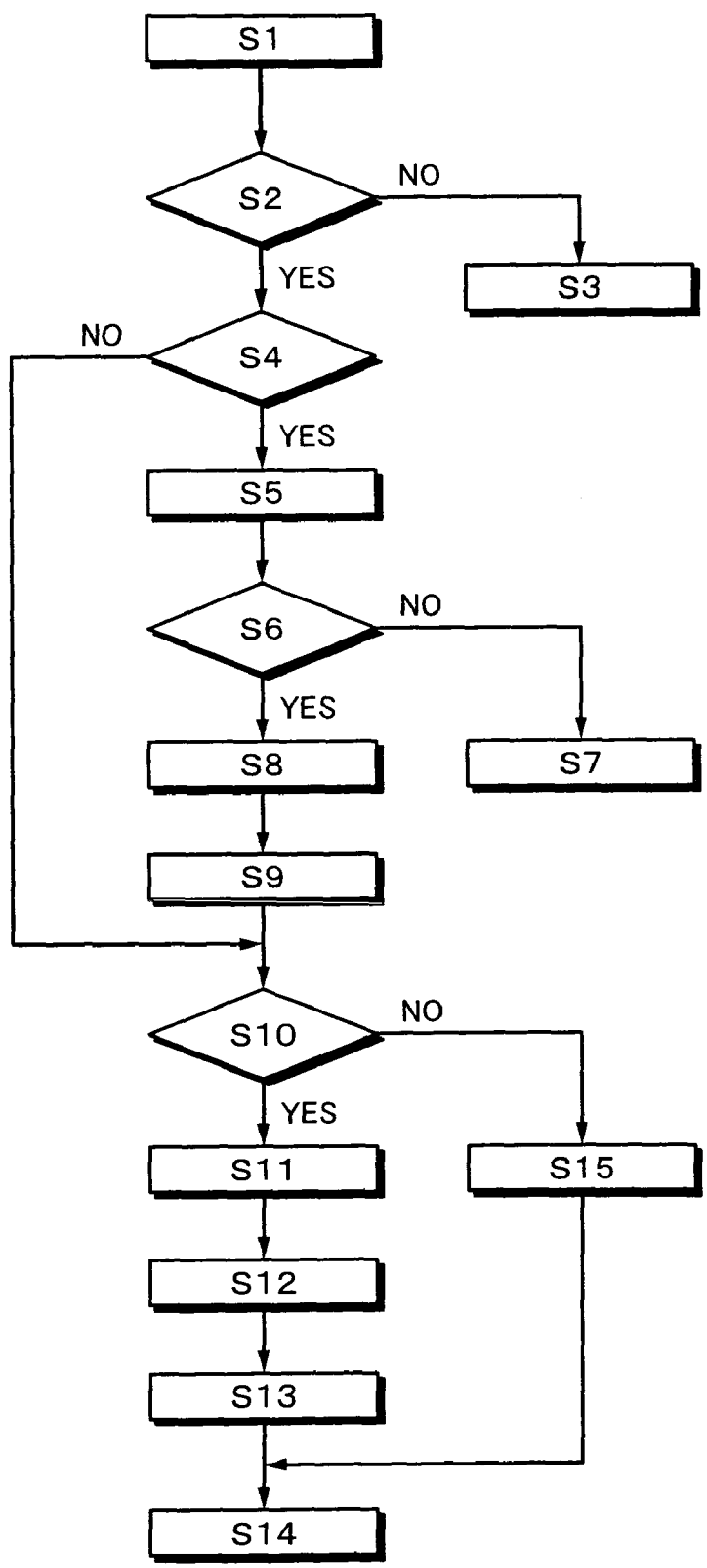
FIG. 17 is a flow chart for explaining a process performed for property information when a file is deleted.

Next, with reference to FIG. 17, a file deleting process will be described. This process is performed under the control of a system controller (microcomputer) of the camera integrated digital recording and reproducing apparatus described with reference to FIG. 2. At the first step S1, a deletion of a file (AV file) x is selected on a file list which is displayed. For example, the file x is selected from a file list or a plurality of thumbnail pictures displayed on the display panel (see FIG. 2).

At step S2, it is determined whether or not the value of the referred counter of an entry to which the file x has been registered in the index file is 0. When the value is not 0, it represents that another file references the file x. Thus, since the file x cannot be deleted, an exceptional process is performed (at step S3). For example, a message which represents that the file cannot be deleted-is displayed for the user.

When the determined result at step S2 represents that the value of the referred counter is 0, the flow advances to step S4. At step S4, it is determined whether or not the value of the entry property 4 is 1. In other words, it is determined whether or not the file x references another file. When the value of the entry property 4 is 1, the flow advances to step S5. At step S5, an entry of which the value of the referring file list is the entry number (or the ID) of the file x (namely, an entry referred from the file x) is searched.

At step S6, it is determined whether or not there is an entry referred from the file x. When the determined result represents that there is no entry referred from the file x, the flow advances to step S7. At step S7, an exceptional process is performed. For example, a message that represents that data is inconsistent is displayed for the user. Since the value of the entry property 4 is 1 at step S4, an entry referred from the file x must be present. However, since such an entry is absent, it is assumed that data is inconsistent.

When the determined result at step S6 represents that there is an entry referred from the file x, the flow advances to step S8. At step S8, the value of the referred counter of the entry is decremented. At step S9, the entry number (or the ID) of the file x is deleted from the referring file list.

Next, at step S10, it is determined whether or not the entry of the file x is to delete. In the process shown in FIG. 17, when the AV file x is deleted, the corresponding entry can be selectively deleted from the index file depending on for example whether or not the recording medium has a sufficient free space. When the recording medium has a sufficient free space, the method of which the entry is not deleted is selected. When the recording medium does not have a sufficient free space, the method of which the entry is actually deleted is selected.

At step S10, when the process for deleting the entry of the file x is selected, the flow advance to step S11. At step S11, as shown in FIG. 15, the corresponding entry is deleted from the index data atom. At step S12, data preceded by the deleted entry is moved so that the blank logical space is filled up. At step S13, in the index atom, data of the management file is updated. When the determined result at step S10 represents that the entry of the file x is not deleted, the flow advances to step S15. At sep S15, the value of the entry property of the entry is changed to 1 (representing an invalid entry).

Steps S13 to S15 are a data rewriting process performed on a semiconductor memory of the system controller of the system for example the camera integrated digital recording and reproducing apparatus. At a proper timing, namely immediately before the recoding medium is ejected from the apparatus or at predetermined intervals, data of the recording medium is updated (at step S14). In other words, the AV file x on the recording medium is deleted from the recording medium and the index file thereon is updated.

Figure 18:
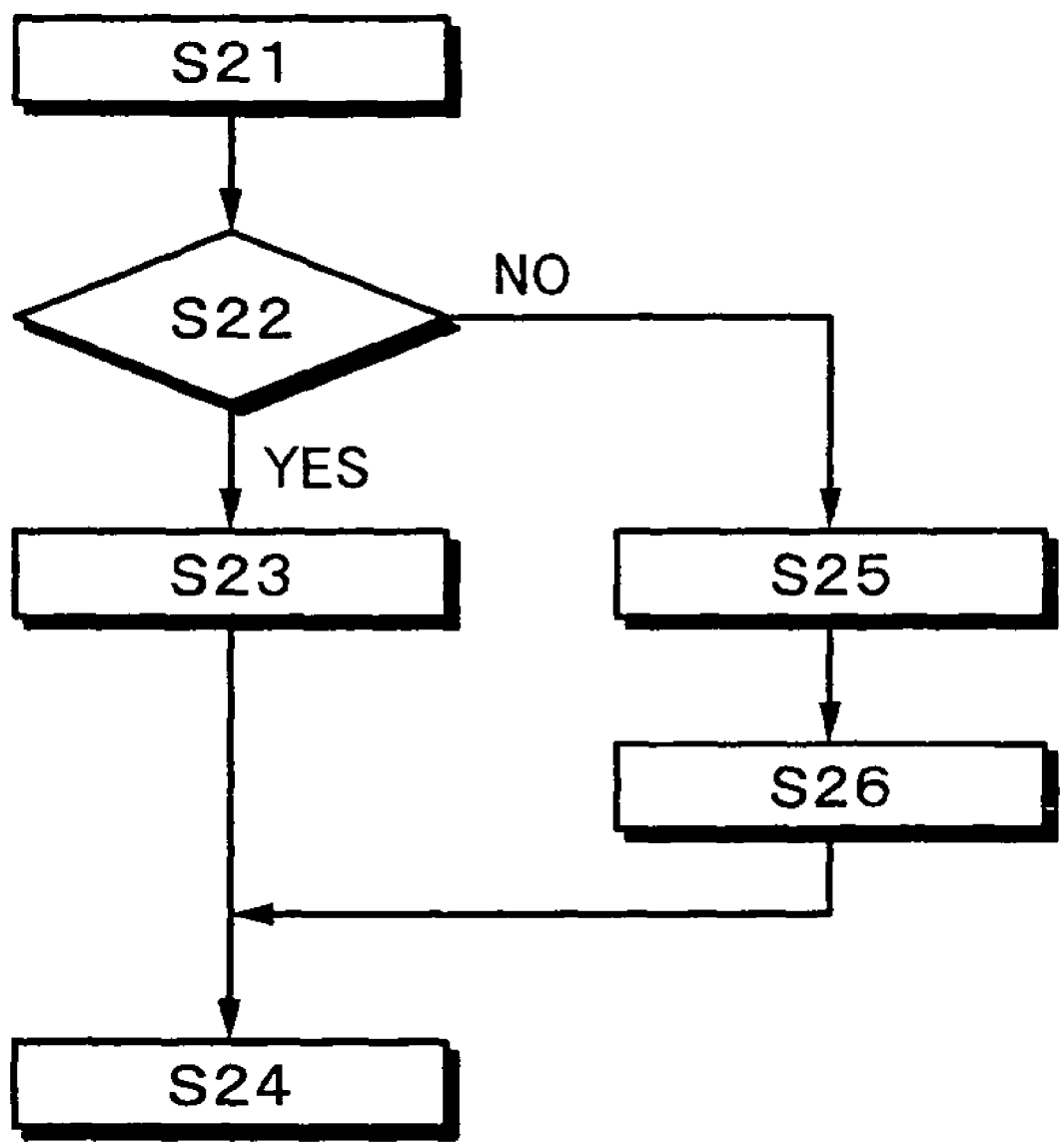
FIG. 18 is a flow chart for explaining a process performed when an entry of a file is added.

Next, with reference to FIG. 18, a file adding process performed after a file has been deleted will be described. At step S21, a process for adding the file X is started. At step S22, an entry of which the value of the entry property 3 is invalid is searched. In this example, an entry whose entry property 3 is 1 is invalid.

Figure 19:
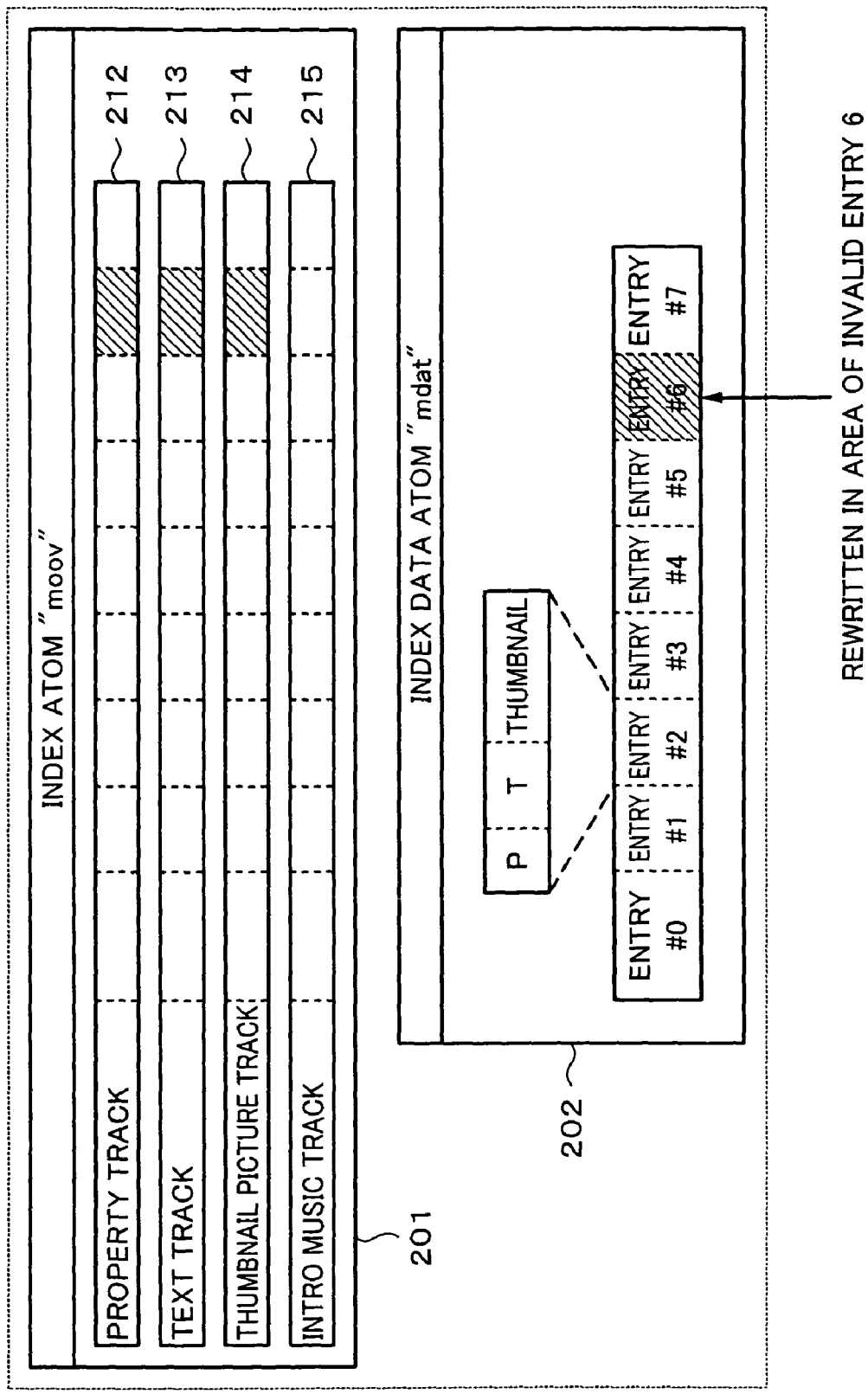
FIG. 19 is a schematic diagram for explaining an example of a process performed when an entry of a file is added.

When the determined result at step S22 represents that there is an invalid entry, the flow advances to step S23. At step S23, a new entry is rewritten to the area of the invalid entry. FIG. 19 shows a process performed in the case that entry #6 is an invalid entry. In this case, it is not necessary to rewrite the index atom which is management data of the index file.

Figure 20:
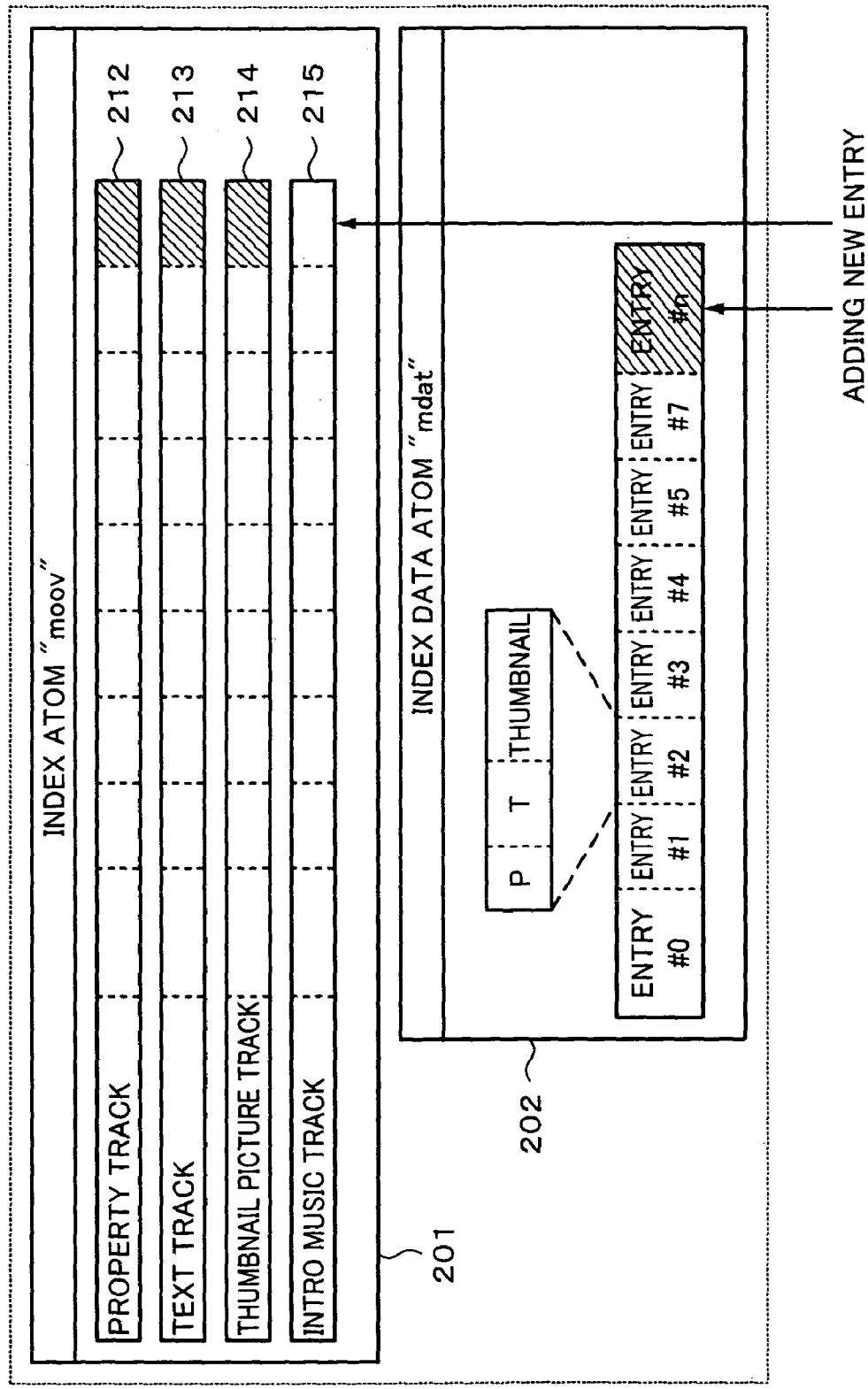
FIG. 20 is a schematic diagram for explaining another example of a process performed when an entry of a file is added.

In contrast, when the determined result at step S22 represents that there is no invalid entry, the flow advances to step S25. At step S25, new entry information is added at any location of the index file. At step S26, the management information for each track of the index atom is updated so that it prescribes the added entry. FIG. 20 shows a process for adding a new entry as entry #n.

Steps S23 to S26 are a data rewriting process performed on the semiconductor memory of the system controller of the system for example a camera integrated digital recoding and reproducing apparatus. At a proper timing (namely, immediately before the recording medium is ejected from the apparatus or at predetermined intervals), data on the recording medium is updated (at step S24).

Since the property information contains information representing a reference relation of files, without need to access real files, the reference relation can be managed. Thus, the determination of whether or not a file can be deleted can be performed at high speed.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention. For example, a genre (classic, jazz, rock, popular, etc) of AV files (music data) can be identified with for example flags. When the attribute information of the flags is defined, it can be defined for all the range or a predetermined range of the index file. In the forgoing, an example using QuickTime was described. Of course, the present invention can be applied for other application software.

According to the present invention, in the recording apparatus, the recording method, the program, the recording medium on which the program has been recorded, and the photographing apparatus having the recording apparatus, a part of property information of an index file can contain information which defines attribute information (flags). Thus, without need to increase data amount of attribute information, desired attribute information can be prescribed. For example, in consideration of the type of the apparatus, attribute information for each apparatus can be prescribed. With information which defines attribute information, a new apparatus and an old apparatus can handle attribute information. As a result, the generality is improved.

According to the present invention, with attribute information of files, they can be searched and sorted at high speed. For example, by extracting only entries of which the same flag bit is 1, files can be searched or sorted.

According to the present invention, since entry management information contains information which represents a reference relation of files, without need to access files, the reference relation thereof can be managed. As a result, the determination of whether or not a file can be deleted can be performed at high speed. In addition, an alarm for a user can be displayed at high speed. In addition, since there is information which represents whether each entry is valid/invalid, when a file is deleted, it is not necessary to delete the corresponding entry. As a result, the recording medium can be rewritten in the minimum area. Consequently, the file deleting process can be performed at high speed. In addition, with information which represents whether each entry is valid/invalid, an entry which is treated as an invalid entry (for which an invalidating process has been performed) is detected. An entry to be added to the detected entry is rewritten. As a result, without need to change data of an entry and a management area, the entry can be added at high speed.

DESCRIPTION OF REFERENCE NUMERALS

11 VIDEO ENCODER
12 AUDIO ENCODER
13 VIDEO DECODER
14 AUDIO DECODER
15 FILE CREATOR
16 FILE DECODER
17,20 MEMORY
18 MEMORY CONTROLLER
19 SYSTEM CONTROLLING MICROCOMPUTER
21 ERROR CORRECTION CODE ENCODER/DECODER
23 DATA MODULATOR/DEMODULATOR
24 MAGNETIC FIELD MODULATION DRIVER
26 OPERATING PORTION
30 SERVO CIRCUIT
31 MOTOR
32 MAGNETIC FIELD HEAD
33 OPTICAL PICKUP
40 RECORDING MEDIUM
50 CAMERA INTEGRATED DIGITAL RECORDING AND REPRODUCING APPARATUS
51 MAIN BODY
52 LENS PORTION
53 SOUND CONCENTRATING MICROPHONE
54 DISPLAY PANEL
55 POINTING DEVICE
201 INDEX ATOM
202 INDEX DATA ATOM
231 PROPERTY
232 TEXT
233 THUMBNAIL
234 INTRO
S1 SELECT DELETION OF FILE x ON FILE LIST DISPLAY
S2 REFERRED COUNTER =0?
S3 NOT DELETED. PERFORM EXCEPTIONAL PROCESS
S4 ENTRY PROPERTY 4 =1?
S5 SEARCH ENTRY WHICH SATISFIES REFERRING FILE LIST =FILE x
S6 PRESENCE OF ENTRY ?
S7 PERFORM EXCEPTIONAL PROCESS
S8 DECREMENT REFERRED COUNTER
S9 DELETE FILE x FROM REFERRED FILE LIST
S10 IS ENTRY OF FILE x DELETED ?
S11 DELETE ENTRY FROM INDEX DATA ATOM
S12 MOVE DATA PRECEDED BY DELETED ENTRY
S13 UPDATE DATA OF MANAGEMENT FILE OF INDEX ATOM
S14 UPDATE DATA ON RECORDING MEDIUM
S15 UPDATE ENTRY PROPERTY 3 OF ENTRY OF FILE x TO 1 (INVALID)
S21 ADD ENTRY OF FILE x
S22 IS THERE ENTRY WHICH SATISFIES ENTRY PROPERTY 3 =INVALID ?
S23 REWRITE ENTRY TO AREA OF INVALID AREA
S24 UPDATE DATA ON RECORDING MEDIUM
S25 ADD ENTRY AT ANY LOCATION OF INDEX FILE
S26 UPDATE MANAGEMENT INFORMATION FOR EACH TRACK

The invention claimed is:

1. A recording apparatus comprising:
a recording medium comprising index data of a plurality of files of contents data and the files; and
correlation means for correlating the index data of the plurality of files of contents data with the files; and
formation means for forming the correlated index data in a predetermined format as an index file; and
deletion means for deleting the index file,
wherein the index data further comprises:
a plurality of entries, each entry corresponding to a designated file of contents data,
wherein each entry comprises a file identifier which represents the location of the designated file, thumbnail information related to the designated file, and text information related to the designated file, validity information which represents whether the designated file is valid or invalid, and attribute information, wherein the attribute information includes relation data which represents a reference relation data which contains at least information specifying a file which refers to the designated file and information representing whether the designated file refers to another file, wherein, before the designated file of contents data is deleted, the reference relation data is checked and it is determined whether or not another file references the designated file, and wherein, before the designated file is deleted and after it is determined whether or not another file references the designated file, the reference relation data is checked and it is determined whether of not the designated file references another file.

2. The recording apparatus as set forth in claim 1, wherein the attribute information further includes:
a number which is referred by another file.

3. The recording apparatus as set forth in claim 1, wherein the index data containing a plurality of management information and attribute information corresponding to the files of contents data and each management data contains a unique number in the index file; and
wherein the information specified a file which refers to the file is the unique number of the management information of the file.

4. The recording apparatus as set forth in claim 1, further comprising:
when a deletion of a file of contents data is selected, determining whether the file is selected to delete refer to another file or not based on the information representing whether the file refers to another file or not in the index file, processing the deletion of the file which is selected to delete based on the result of the determination.

5. The recording apparatus as set forth in claim 1, further comprising:
when a deletion of a file of contents data is executed, searching an entry which corresponds to the file referred by the deleted file in the index file, modifying the relation data of the attribute information of the searched entry.

6. The recording apparatus as set forth in claim 2, further comprising:
when a deletion of a file of contents data is selected, processing the deletion of the file which is selected to delete based on the number which is referred by another file, which is in the attribute information of the entry corresponds to the deleted file.

7. The recording apparatus as set forth in claim 1, wherein the validity information of the entry corresponding attribute information can be changed as invalidity, when the designated file is deleted.

8. The recording apparatus as set forth in claim 1, wherein relation data can he modified according to the information specifying a file which refers to the designated file of the entry of the designated file, when the designated file is deleted.

9. A recording method, comprising the steps of:
correlating index data of a plurality of files of contents data recorded on a recording medium utilizing a processor;
forming the correlated index data in a predetermined format as an index file utilizing a processor;
wherein the index data further containing:
a plurality of entries, each entry corresponding to a designated file of contents data, wherein each entry includes a file identifier which represents the location of the designated file, thumbnail information related to the designated file, and text information related to the designated file, validity information which represents whether the designated file is valid or invalid, and attribute information, wherein the attribute information includes relation data which represents reference relation data which contains at least information specifying a file which refer to the designated file and information representing whether the designated file refers to another file, wherein, before the designated file of contents data is deleted, the reference relation data is checked and it is determined whether or not another file references the designated file, and wherein, before the designated file is deleted and after it is determined whether or not another file references the designated file, the reference relation data is checked and it is determined whether of not the designated file references another file.

10. A non-transitory computer readable medium storing a computer program for causing a computer to execute a recording method, comprising the steps of:
correlating index data of a plurality of files of contents data recorded on a recording medium;
forming the correlated index data in a predetermined format as an index file;
wherein the index data further containing:
a plurality of entries, each entry corresponding to a designated file of contents data, wherein each entry includes file identifier which represents the location of the designated file, thumbnail information related to the designated file, and text information related to the designated file, validity information which represents whether the designated file is valid or invalid, and attribute information, wherein the attribute information includes relation data which represents reference relation data which contains at least information specifying a file which refer to the designated file and information representing whether the designated file refers to another file, wherein, before the designated file of contents data is deleted, the reference relation data is checked and it is determined whether or not another file references the designated file, and wherein, before the designated file is deleted and after it is determined whether or not another file references the designated file, the reference relation data is checked and it is determined whether of not the designated file references another file.

11. A non-transitory computer readable recording medium on which a program has been recorded, the program being configured to cause a computer to execute a recording method, comprising the steps of:
correlating index data of a plurality of files of contents data recorded on a recording medium;
forming the correlated index data in a predetermined format as an index file;
wherein the index data further containing:
a plurality of entries, each entry corresponding to a designated file of contents data, wherein each entry includes file identifier which represents the location of the designated file, thumbnail information related to the designated file, and text information related to the designated file, validity information which represents whether the designated file is valid or invalid, and attribute information, wherein the attribute information includes relation data which represents reference relation data which contains at least information specifying a file which refer to the designated file and information representing whether the designated file refers to another file, wherein, before the designated file of contents data is deleted, the reference relation data is checked and it is determined whether or not another file references the designated file, and wherein, before the designated file is deleted and after it is determined whether or not another file references the designated file, the reference relation data is checked and it is determined whether of not the designated file references another file.

12. A photographing apparatus, comprising:

a recording apparatus for correlating index data of a plurality of files of contents data recorded on a recording medium, wherein the correlated index data is formed in a predetermined format as an index file, and wherein the index data further containing:

a plurality of entries, each entry corresponding to a designated file of contents data, wherein each entry includes file identifier which represents the location of the designated file , thumbnail information related to the designated file, and text information related to the designated file, validity information which represents whether the designated file is valid or invalid and attribute information, wherein the attribute information includes relation data which represents reference relation data which contains at least information specifying a file which refer to the designated file and information representing whether the designated file refers to another file, wherein, before the designated file of contents data is deleted, the reference relation data is checked and it is determined whether or not another file references the designated file, and wherein, before the designated file is deleted and after it is determined whether or not another file references the designated file, the reference relation data is checked and it is determined whether of not the designated file references another file.

* * * * *